United States Patent [19]

Fihey et al.

[11] Patent Number: 4,959,523

[45] Date of Patent: Sep. 25, 1990

[54] METHOD AND APPARATUS FOR AUTOMATICALLY SENSING THE CONFIGURATION OF A SURFACE AREA AND EFFECTING A WORK FUNCTION THEREON

[75] Inventors: Jean-Luc Fihey, Ste. Julie; Bruce Hazel, Montreal; Antonio Di Vincenzo, Ville d'Anjou; Mark Tinkler, Toronto; Scott McNabb, Crescent Etobicoke, all of Canada

[73] Assignees: Hydro-Quebec, Quebec; Ontario Hydro, Ontario, both of Canada

[21] Appl. No.: 273,075

[22] Filed: Nov. 18, 1988

[51] Int. Cl.$^5$ ............................................... B23K 9/12
[52] U.S. Cl. ........................... 219/124.34; 219/125.1; 901/42
[58] Field of Search ........... 219/125.1, 125.11, 124.22, 219/124.34; 901/42

[56] References Cited

U.S. PATENT DOCUMENTS

| | | | |
|---|---|---|---|
| 4,531,192 | 7/1985 | Cook | 219/124.22 |
| 4,596,919 | 6/1986 | Kremers et al. | 219/124.34 |
| 4,716,271 | 12/1987 | Hulsizer et al. | 219/125.11 |
| 4,841,123 | 6/1989 | Novak et al. | 219/125.11 |

*Primary Examiner*—Clifford C. Shaw
*Attorney, Agent, or Firm*—Oblon, Spivak, McClelland, Maier & Neustadt

[57] ABSTRACT

A method and apparatus for automatically sensing the configuration of a damaged surface area and wherein the apparatus is provided with an arc gouging tool, a welding tool, and a grinding tool to gouge damaged areas and fill them with weld material to at least the surface profile of the surface in the working environment and to grind the filled areas flush with the surface of the working environment. A track is bent to a profile enabling the apparatus to work without any collision with its environment while keeping full access to the work area. The geometry of the track is generally unknown to the control circuit of the robot. A motor-actuated robot member is connected to the track and is displaceable on the track by a motorized element. A working arm is displaceably coupled to the robot member and has one or more working tools connected thereto. A control circuit displaces the robot and operates the working arm and tool. The working arm has a sensor connected thereto with a probe to sense parameters and to feed information data of the X, Y and Z coordinates to the control circuit to determine the geometry of the surface of the working environment and contour of areas in the working environment requiring a work procedure to be effected by the one or more working tools.

28 Claims, 9 Drawing Sheets

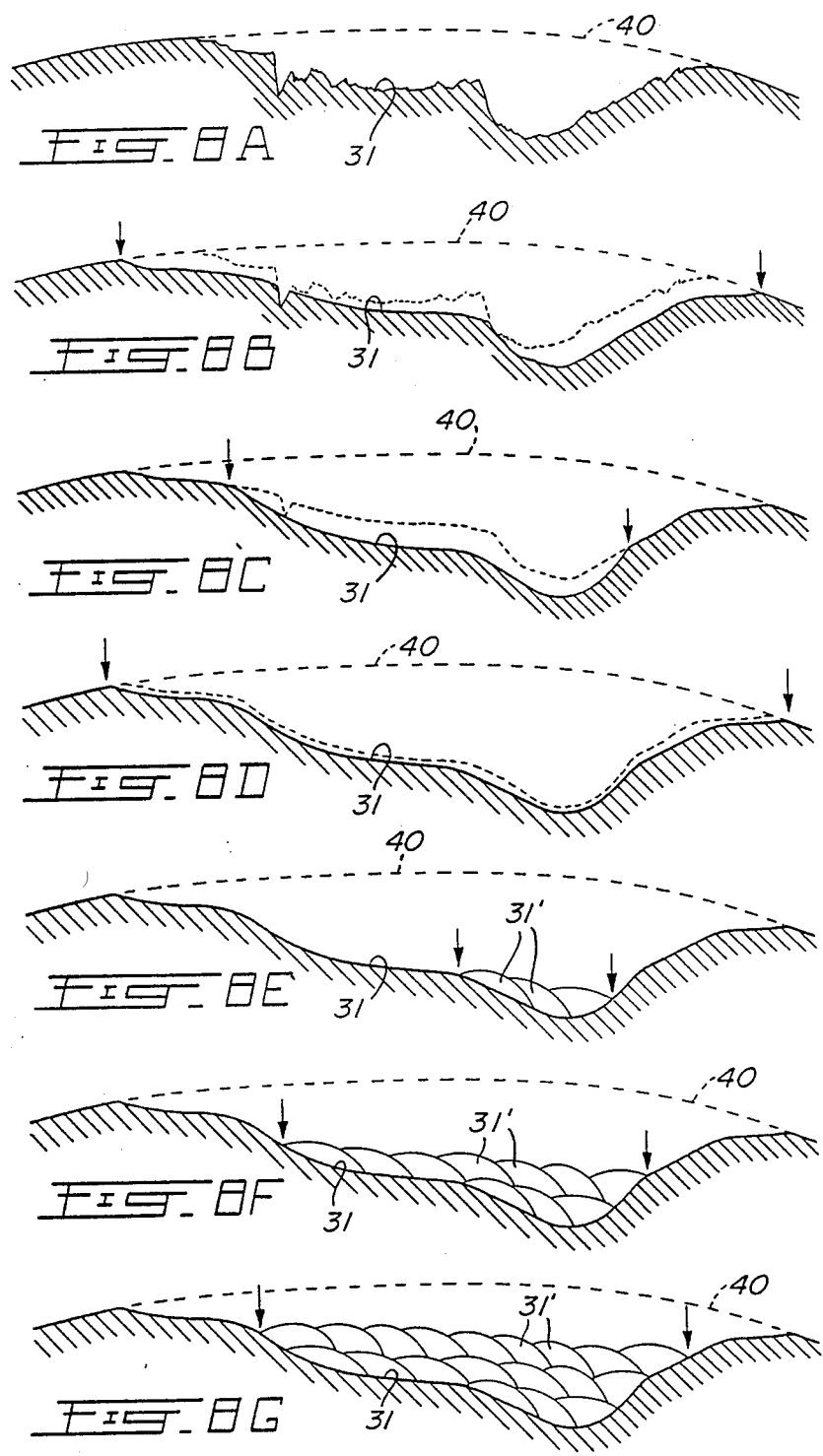

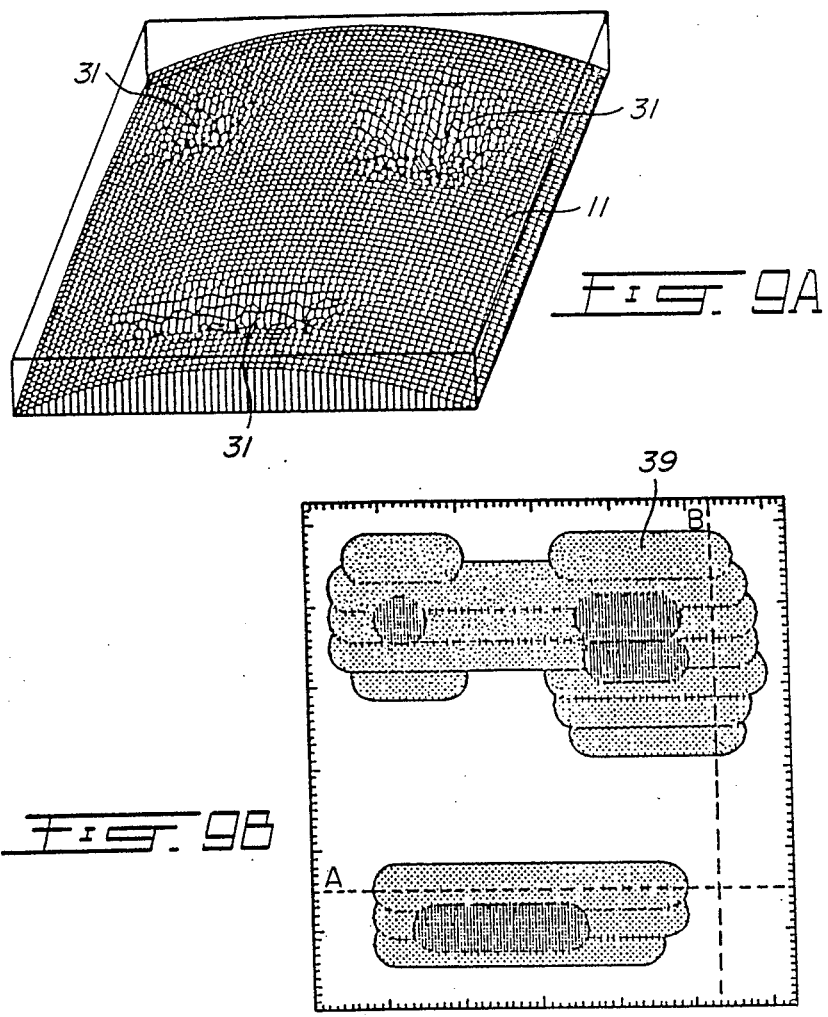
FIG. 9A
FIG. 9B
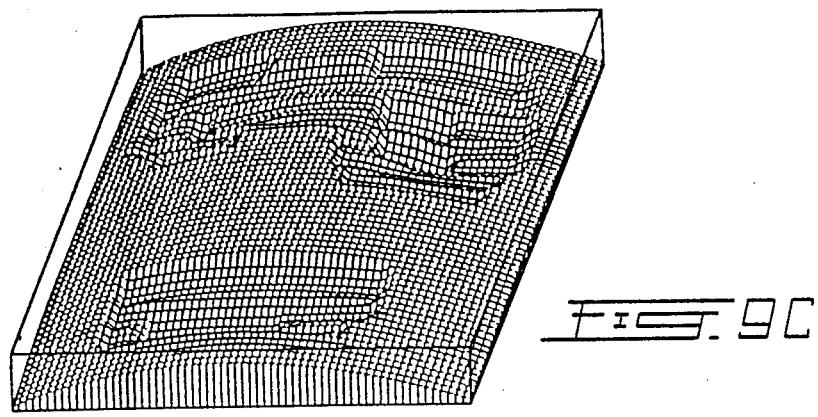
FIG. 9C

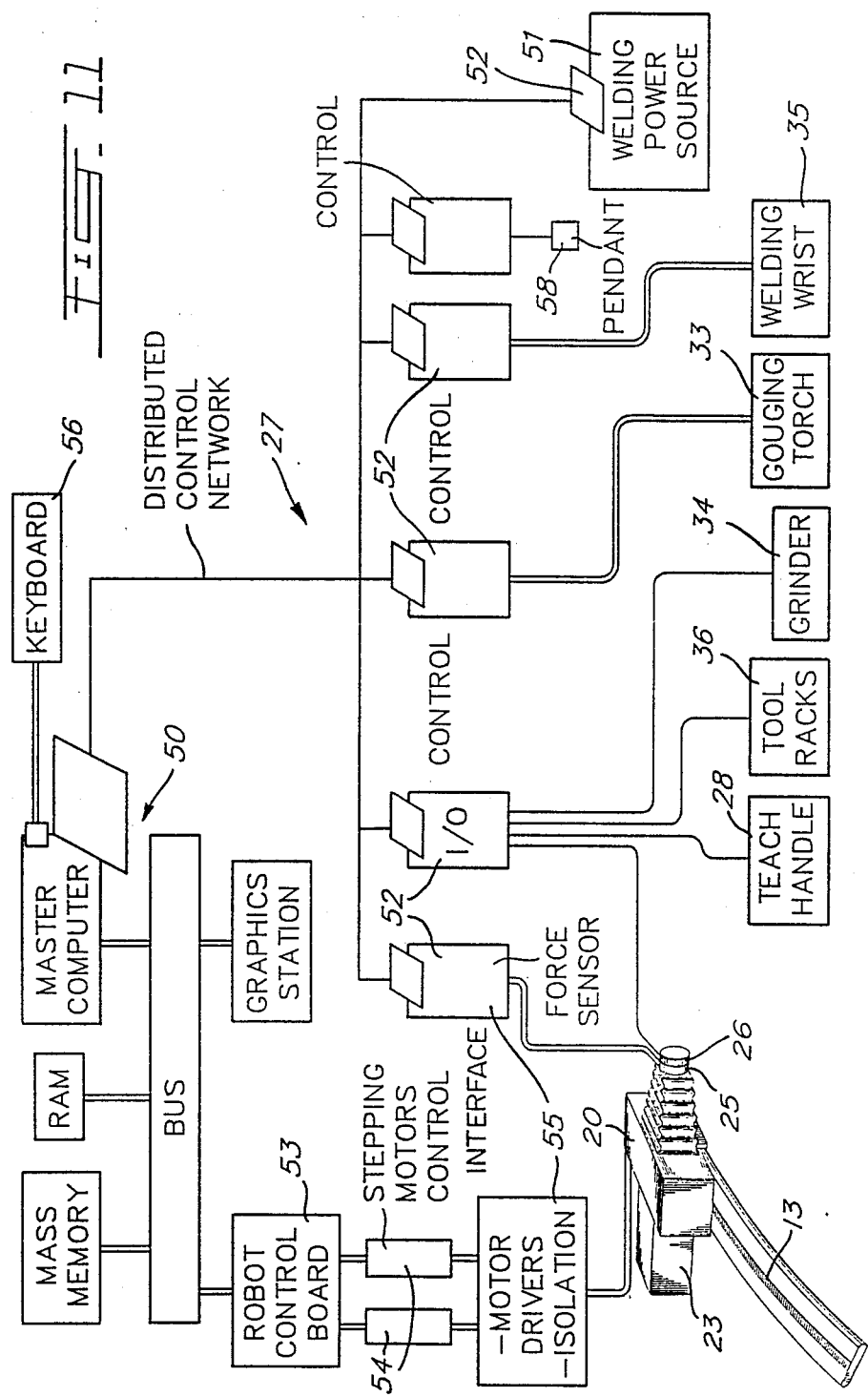

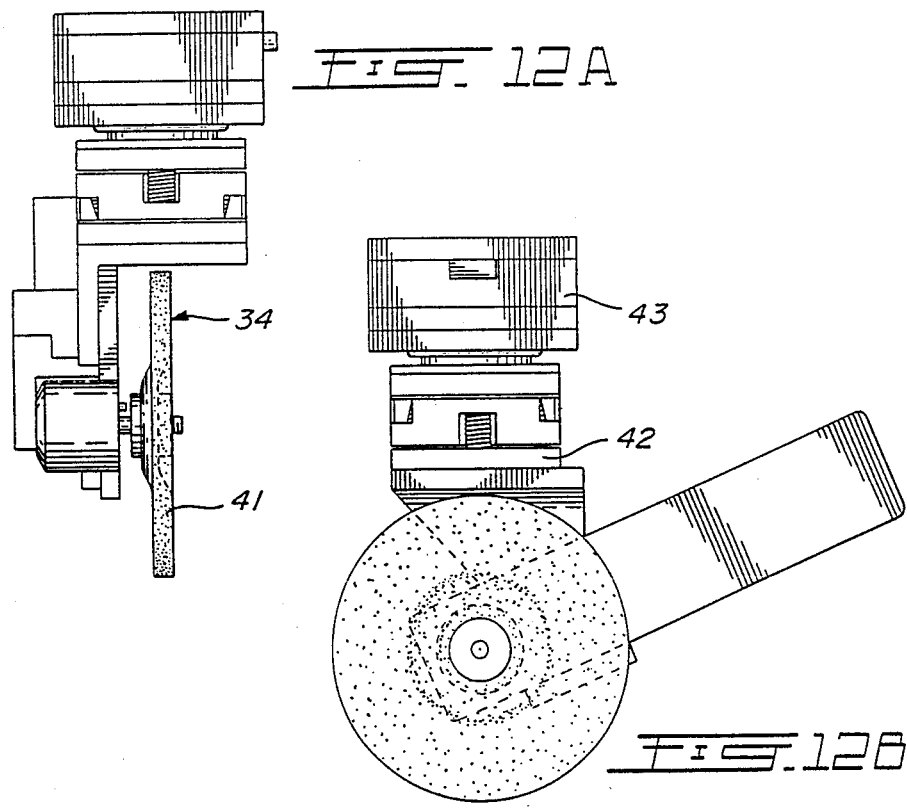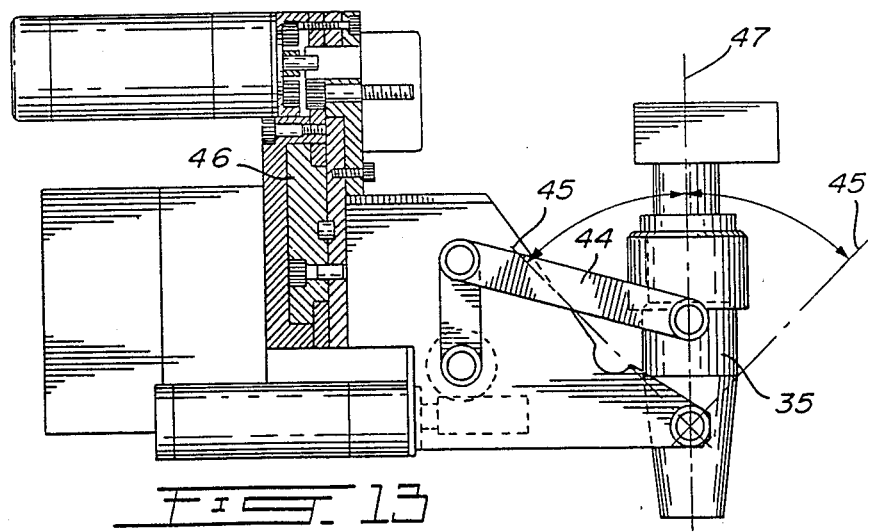

METHOD AND APPARATUS FOR AUTOMATICALLY SENSING THE CONFIGURATION OF A SURFACE AREA AND EFFECTING A WORK FUNCTION THEREON

BACKGROUND OF THE INVENTION

1. Field of Invention

The present invention relates to a method and apparatus for automatically sensing the configuration of a surface area of an object, such as a portion of a hydraulic turbine runner located in a pit of a turbine generator and effecting a work function such as the repair of cavitation damage thereon, and more particularly to the use of a robotic system for the in-situ repair of such damage.

2. Description of Prior Art

The present invention originated by solving the problem of repairing hydraulic turbine runners in power stations which are often damaged by cavitation due to erosion. Such runners are often subjected to severe damage requiring extensive repair which is extremely costly due to the lengthy down time of the runner and because of the difficulty in effecting such repairs. The most economical way of repairing such turbines is to perform the work with the runner remaining in the turbine pit. The steps involved in the repair include air-arc gouging and/or grinding to remove unsound metal, followed by welding to fill the gouged-out areas. Finally, the weld-filled cavity must be ground to restore optimum blade profile. During these activities within the confined area of the turbine pit, workers are subjected to a number of hazards including fumes, noise, spatter, arc radiation, and flying particles of metal during grinding. Furthermore, limited access to damaged areas often requires the workers to operate in awkward and uncomfortable postures, In order to reduce the hazards of such repairs the worker must use welding elements equipped with air filtration with a fresh air supply, and the provision of large fans to ventilate the turbine runner area. Nevertheless, this still remains a difficult environment in which to work, and there is potential health hazards due to poor ventilation and uncomfortable working conditions. All this adds to significant adverse effect on productivity, and may also influence the quality and integrity of the repair.

There is known a few mechanical systems in the prior art which are rail-mounted and which can transport a tool and displace this tool over a surface and at a speed which is adjustable by an operator. One type of such system utilizes a deformable rail that may be adjusted to the shape of a surface and usually along one or two axes which are straight and perpendicular to one another. If such a system is utilized to effect a work function on a complex surface, it is necessary that between each sweep or pass of the working element the operator intervenes to make an adjustment to the apparatus, such as the displacement of the rails, before the apparatus effects a second pass. Another system is known where an apparatus can sweep a surface without the intervention of an operator, but these surfaces must be of a constant shape, such as a cylinder. With such system the rail follows the profile of the cylinder with the robotic tool always maintained parallel to the surface. An example of such robotic apparatus is that utilized to deposit weld beads internally of a cylinder by means of a welding torch. However, the cylinder has a perfectly round surface and there is no need to adjust the apparatus.

In order to effect a work function on surfaces that are complex, one can consider utilizing an industrial robot which functions using the playback principle. When using this playback principle it is necessary to teach the robot, point by point, the trajectory of the working tool over the entire surface to be covered by the robot. This may represent thousands of points over a given surface, and the programming or teaching time becomes extremely long. This type of system is feasible when a robot is used to effect a repetitive work function, such as spot welding a specific frame or other type device. However, such system is not feasible for use in repairing objects, such as turbine runners, where each repair function has its own geometry. Also, such industrial robots are too large, heavy, and cumbersome to be attached to an object to effect a work function, in situ, in an area where space is restrained, such as in a pit of a turbine engine.

SUMMARY OF INVENTION

It is therefore a feature of the present invetion to provide a method and apparatus for automatically sensing a surface configuration to determine the integrity thereof and automatically effecting a work function to repair any irregularities thereon, such as cavitation or other imperfections.

Another feature of the present invention is to provide a method and apparatus using a robotic system for automatically sensing the configuration of a surface area of an object, and effecting a work function thereon in situ.

Another feature of the present invention is to provide a method and apparatus which is small, portable, self-programming and easily attachable to a work surface for automatically sensing the configuration of a surface area of the said surface and effecting a work function.

Another feature of the present invention is to provide a method and apparatus for automatically sensing the configuration of a surface area of an object and effecting a work function, and wherein a robotic system is utilized which self-programs the work function and automatically effects the work thereto while providing the option of an operator intervention to command or assist in the determination and sequence of work procedures.

Another feature of the present invention is to provide a method and apparatus for automatically sensing the configuration of a surface area of an object, such as on a hydraulic turbine runner, and effecting a work function to repair cavitation damage or imperfections thereon, and wherein said work function comprises gouging, welding and grinding.

Another feature of the present invention is to provide a method and apparatus for automatically sensing the configuration of a surface area of an object and effecting a work function, and wherein the apparatus is substantially all automatic and easy to install and operate.

Another feature of the present invention is to provide a method and apparatus which is small, portable, capable of being operated in a confined space, self-programming and easily attachable to a work surface for automatically sensing the configuration of a surface area of said surface and effecting a work function.

The apparatus comprises a track connectible relative to the surface. This track is bent and oriented with respect to the workpiece in such a way that the manipulator maintains full access to the work area without any risk of collision with the surroundings.

According to the above features, from a broad aspect, the present invention provides an apparatus for automatically sensing the configuration of a surface area of an object, and effecting a work function thereon. The apparatus comprises a track connectible relative to the surface. A motor-actuated robot member is connectible to the track and has a motorized element provided with track coupling means engaged with the track for displacing the robot member at a predetermined rate and position along the track. A working arm is displaceably coupled to the robot member. The working arm has one or more working tools connectible thereto. A control circuit is associated with the robot member for displacing same and operating the working arm and tool. A sensor is connected to the working arm and has a probe to sense a distance which is measured along a normal of said surface or any surface calculated by said control circuit assumed to be representative of said surface in a delineated working environment of the robot member and working arm. The sensor feeds information data of the X, Y and Z coordinates to the control circuit to determine the geometry of the surface of the working environment and contour of areas in the working environment requiring a work procedure to be effected by the one or more working tools.

According to a further broad aspect of the present invention there is provided a method of automatically sensing the configuration of a surface area and effecting a work function thereon. The method comprises the steps of connecting a support track over a section of the surface area. The track has motor-actuated robot member connected thereto and equipped with a working arm displaceably coupled therewith. A sensor is connected to the working arm and a control circuit is associated with the robot member. The robot member and working arm are displaced along X and Y coordinates respectively, of a delineated working environment adjacent the tracks while sensing the distance between the surface and a reference point of the arm along the Z coordinate, and producing and storing information data signals relating to X, Y and Z coordinates to determine the surface configuration of the surface area whereby to detect irregular surface areas within the working environment. A series of coordinate points are then selected about an irregular surface area to determine a reference plane based on three of the points, and to find the projection of all points on this plane to determine the polygonal contour in the plane and store information signals representative thereof. A tool is selected and connected to the working arm and effects a work function in the polygonal contoured area.

According to a further broad aspect of the present invention there is provided a method of teaching the robot its task in a very efficient way. The method comprises the steps of connecting a support track over a section of the surface area or any surface in the vicinity of the surface area. The track has a motor-actuated robot member connected thereto and equipped with a working arm displaceably coupled therewith. The robot member and working arm are guided either by hand using force feedback from a force sensor connected to the arm or through interaction with a teach pendant. A series of coordinate points are then selected about an irregular surface area. Those coordinates are computed in a Cartesien space X, Y, Z, where X is assumed to be the track axis, and the control circuit interpolates between those points a polygonal or curvilinear contour delimiting the work area. Three of those points are then selected to determine a reference plane, and the projection of the contour on this plane is used by the control system to generate automatically the tool trajectory as parallel lines starting and finishing at this boundary. A tool is selected and connected to the working arm and effects a work function in the polygonal or curvilinear contoured area. This method assumes that the track is flat, which is usually not the case, however as long as the profile of the tool trajectory over the surface in a plane parallel to the track is not too different from the track shape itself, the error in tool positioning arising from this assumption can be corrected by the adaptive control techniques which are implemented on each process. The current is controlled adaptively for the gouging and welding process while the force is controlled for the grinding process. If for some reasons this error is unacceptable, the track shape must be learned in situ by the robot equipped with a sensor.

BRIEF DESCRIPTION OF DRAWINGS

A preferred embodiment of the present invention will now be described with reference to the accompanying drawings, in which

FIGS. 8A through 8M are cross-section views of a cavitated area illustrating a series of work function therein for the automatic repair of same by the apparatus of the present invention;

FIGS. 9A and 9C are perspective views illustrating a delineated working environment by the apparatus and showing cavitation damage and the gouging of such damage;

FIG. 9B is a plan view illustrating the passes of a gouging tool to repair the cavitation damage of FIG. 9A;

FIG. 11 is a block diagram of the control circuit and associated equipment of the apparatus of the present invention;

FIGS. 12A and 12B are front and side elevation views showing a typical construction of a grinding tool secured to the working arm; and FIG. 13 is a side view showing a typical welding tool secured to the working arm.

DESCRIPTION OF PREFERRED EMBODIMENTS

Figure 1:
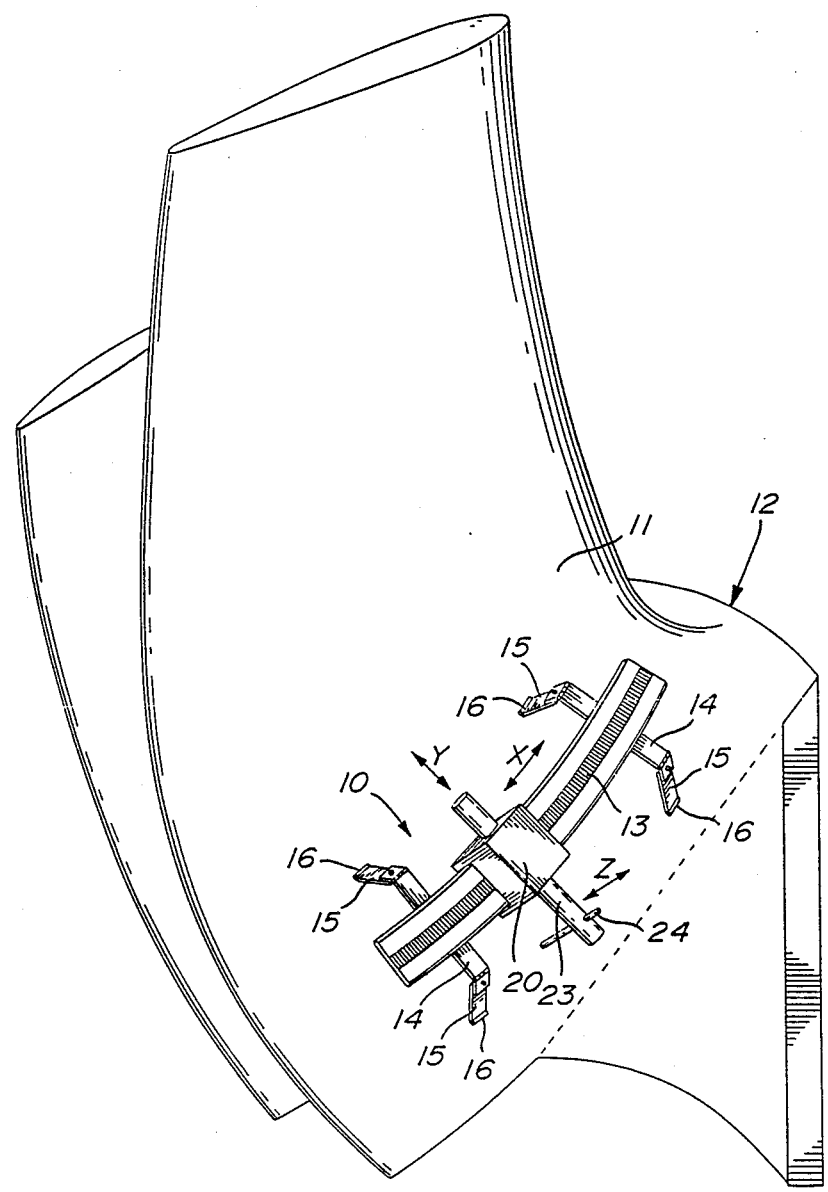
FIG. 1 is a fragmented perspective view showing the apparatus of the present invention as secured to a portion of a hydraulic turbine runner.
Figure 2:
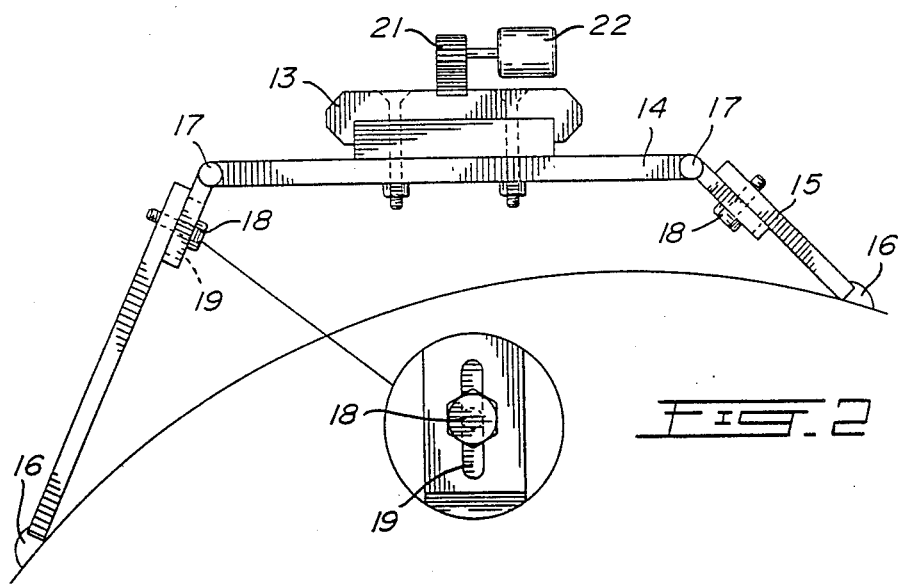
FIG. 2 is a side view illustrating the manner in which the apparatus is secured to a curved surface.

Referring now to the drawings, and more particularly to FIGS. 1 and 2, there is shown generally at 10 the robotic apparatus of the present invention which automatically senses the configuration of a surface, herein the surface of a blade portion 11 of a hydraulic turbine runner 12. The apparatus comprises a track 13 herein supported elevated from the metal surface 11 by a t track support 14. Both the track support 14 and the track 13 are shaped to the configuration of the surface 11. As herein shown, the track support 14 is maintained elevated from the surface 11 by adjustable support legs 15 which are immovably secured to the surface 11 by means such as tack welds 16, as shown in FIG. 2.

The support legs 15 are also pivotally connected to the track support 14 by a hinge connection 17. An adjustment bolt 18 extends through a slot 19 provided in the legs 15 to provide adjustment of the length thereof. Pivot joint and the adjustment bolt provide for finite adjustment for the proper postioning of the track over the working surface 11 whereby the track is substantially parallel to the surface.

As shown in FIG. 1, the apparatus of the present invention comprises a motor-actuated robot member 20 which is connectible to the track 13 through a track coupling gear 21 which is driven by a motor 22 provided within the robot member 20 whereby to displace same at a predetermined rate and position along the track 13. A working arm 23 is displaceably coupled to the robot member and extends transverse to the track 14. The working arm 23 is also provided with one or more working tools 24, as will be described later, which is connectible to the arm.

Figure 3:
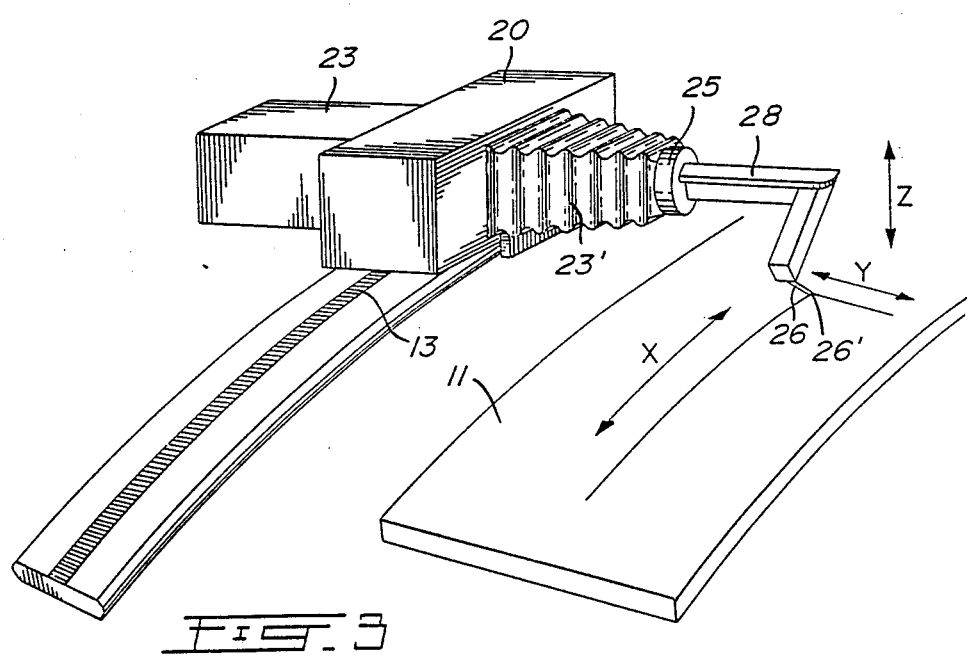
FIG. 3 is a schematic perspective view illustrating the apparatus scanning a surface area of a cylinder; the shape and orientation of the track being such that no adjustment is required along the Z-axis.

As shown in FIG. 3, a sensor 25 is connected to the working arm 23 and has a probe 26 connected to the sensor to sense the distance (along a Z coordinate) between the surface 11 and the arm 23, or any reference point relative thereto, in a delineated working environment delimited by the X and Y coordinates of the robot member and working arm, respectively. The sensor 25 feeds information signals of the X and Y coordinates as well as the Z coordinate to a control circuit 27, as illustrated in FIG. 11. An arm 28 is utilized by the operator to maintain the probe tip 26' against the surface 11 and to manually displace the probe along the X and Y coordinates. The arm is provided with a displaceable connection portion 23' to permit displacement of the probe 26 along the Z axis. The sensor 25 is an essential part of the robotic system and senses the force/moment of the displacement of the probe 26. This sensor is manufactured by JR3 of California and includes an electronic enclosure for signal conditioning and a cross-sensitivity calibration matrix. Foil strain gauges are mounted in the cylindrical-shaped sensor 25 to measure micro strains resulting from the forces and moments applied thereto by the displacement of the arm 28 and/or the moving of the probe tip 26' against the surface 11. The output of the sensor consists of analog information signals which are amplified and filtered and converted into applied force/moment values. The control circuit 27 analyzes these values and determines the damaged areas within a working environment delineated by displacement of the robot and arm along the X and Y axes. The control circuit also determines the work procedure and the selection of working tools, as will be described later.

FIG. 3 illustrates the robot attached to a cylindrical surface 11 and wherein the X and Y axes are substantially parallel and wherein the probe tip 26' is subjected to substantially no displacement along the Z-axis.

Figure 4:
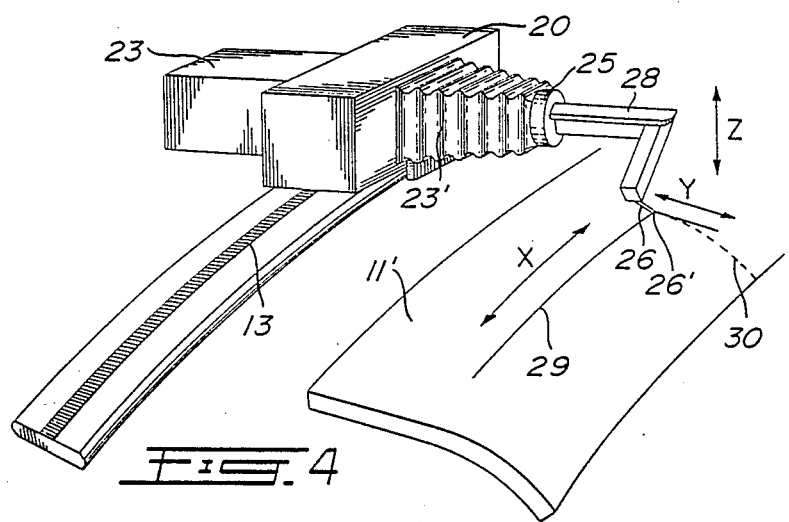
FIG. 4 is a view similar to FIG. 3, but illustrating the apparatus scanning a complex curved surface; in this case adjustment along the Z-axis is required to follow the surface.

Referring now to FIG. 4, there is shown a different surface 11' which is not cylindrical but complex in curvature. The track 13 is shaped to follow the surface along the axis 29 which is the X-axis that the arm 23 follows when the robot member 20 is displaced along the rail 13. However, when the probe 26 is displaced along its Y-axis, it is necessary to move the user arm 28 along the Z-axis and to apply pressure, where necessary, to maintain the probe tip 26' in contact with the surface 11', which surface is bent along the Y axis 30. The sensor 25 monitors the contact force and the system controls this force adaptatively at a constant predetermined value. It should be obvious to a person skilled in the art that the probe 26 and the arm 28 could be replaced by a beam measuring device which automatically measures the distance between the surface and a reference point associated with the arm 23 wherein the entire operation and scanning of the surface in the working environment may be done automatically. The system as herein described utilizes the intervention of an operator to teach the control circuit the location of the damaged area. This could also be automized if the entire working environmental area has been mapped by the probe.

Figure 5:
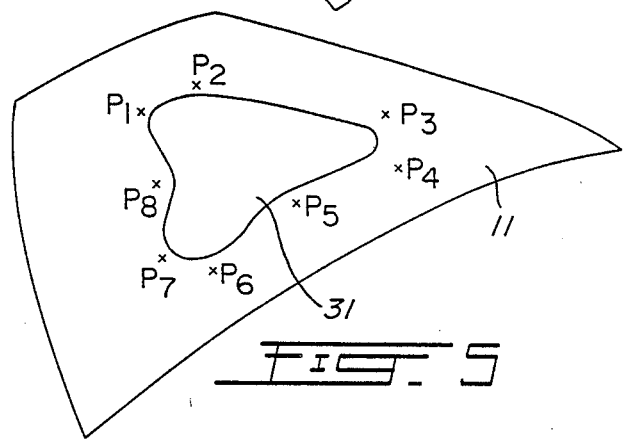
FIG. 5 is a perspective view of a working environment of the apparatus showing the identification of a series of coordinates about a selected damaged area.
Figure 6:
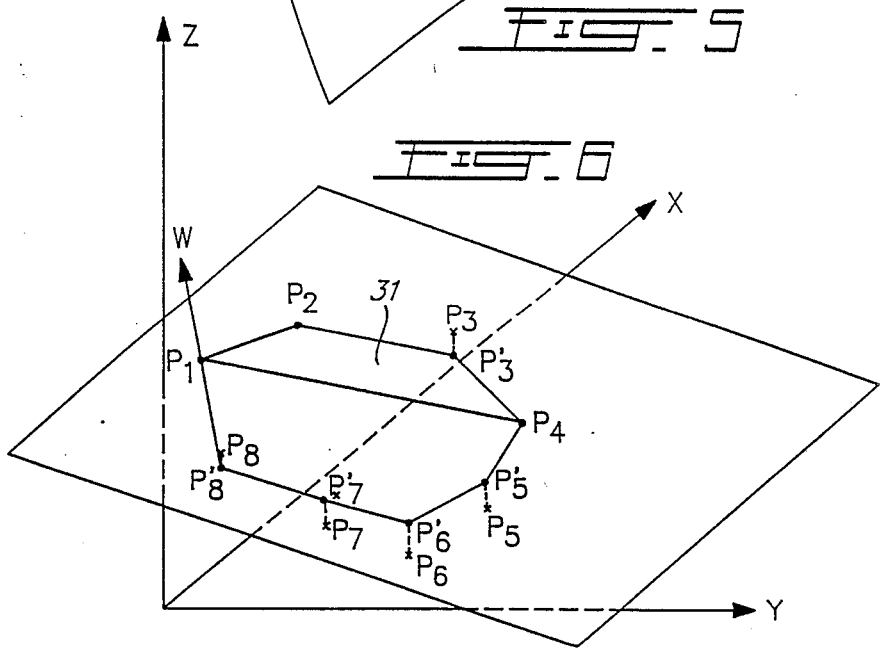
FIG. 6 is a schematic illustration showing the computation of a plane (in X,Y,Z space) based on three points (in this case $P_1$, $P_2$, and $P_4$) and the automatic plotting of a polygonal contour in this plane.
Figure 7:
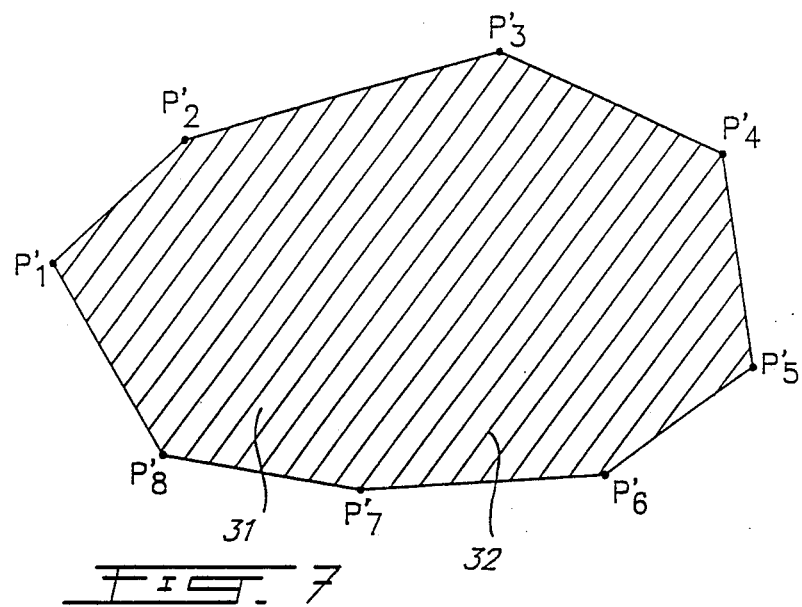
FIG. 7 is a schematic illustration showing the automatic generation of the trajectory of the tool end point in the interior of the polygonal area where a work function is to be situated.

In one embodiment of the invention, the mapping of the entire working environment is bypassed and an operator is utilized to detect an imperfection within the working environment delineated by the X-Y axes. The operator positions the probe tip 26' along a series of coordinate points $P_1$ to $P_8$, as shown in FIG. 5, to delineate the damaged area 31 on the surface 11. These points are located outside the damaged area at a distance such that interconnecting lines between the points do not interfere with the damaged area 31. The control circuit analyzes these points which are stored in memory, generates a plane surface based on three points using the plane surface as a reference, and calculates a delineated polygonal contour by projecting the points onto this plane along the normal to the plane, as illustrated in FIG. 6. Further, as shown in FIG. 7, the control circuit also determines parallel trajectory or passages of a working tool within the plane area delineated by the polygonal contour. This computed planar reference surface (generated by three selected ones of the coordinate points) is a curved surface due to the curvature of the track and trajectory of the robot thereon between the selected points. However, this calculated curved surface does not match identically the real surface due to the fact that the track curvature is not absolutely identical to the curvature of the area within the polygonal contour. If for a given application the error is too large, the tool position must be corrected adaptively along the welding or force feedback control for grinding; in other words the robot monitors some tool parameters and automatically adjusts the tool position relative to the working surface.

The operator may also select additional coordinate points within the polygonal contoured area or segment the polygonal contoured area into sub-areas so that the work may be performed in two or more phases. The distance between each pass, as illustrated at 32 in FIG. 7, is programmed by the operator on a command keyboard 56 (see FIG. 11) and the direction of travel of the tool can also be programmed automatically or by the operator as the control circuit knows all of the coordinate points along the polygonal contour which has been segmented.

In another embodiment of the invention the operator selects additional coordinate points within the polygonal contoured area and the control system calculates a bicubic surface which best fits those points, instead of the planar surface. This approach minimizes the error between said calculated surface and said real surface.

In another embodiment of the invention, the surface is automatically sampled by a robot arm mounted sensor and a map of the working environment is generated based on collection of points homogeneously distributed about this surface. Bicubic interpolation between the points is performed to provide a full representation of the working environment. The final profile required after completion of the repair is also calculated by bicubic interpolation from the undamaged area. The control system calculates tool trajectories on said calculated surface, and the sequence and number of passes are automatically determined based on the knowledge of said final profile.

Figure 10:
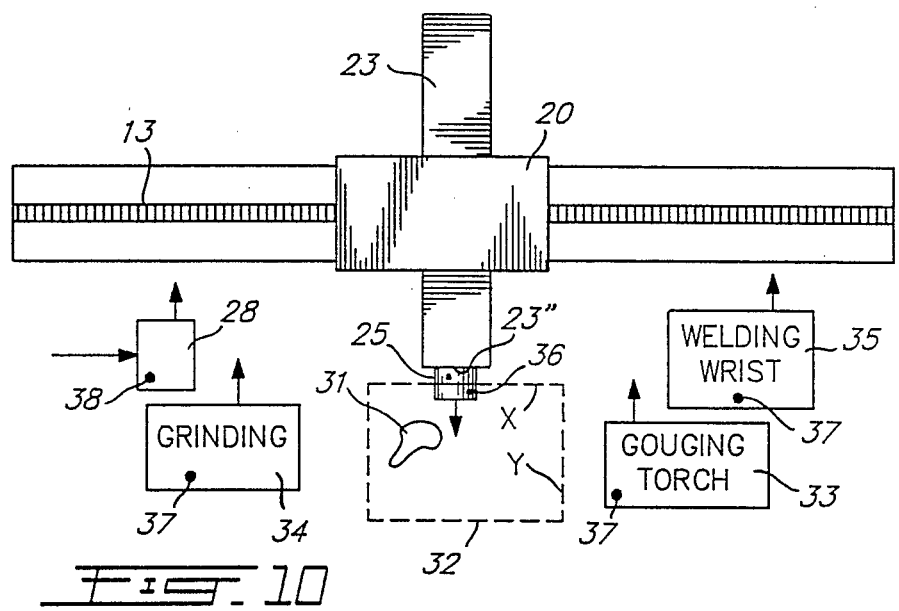
FIG. 10 is a schematic plan view showing the disposition of the various tools associated with the working arm of the robot member.

Referring now to FIGS. 8A to 8M, 9A to 9C and FIG. 10, and firstly to FIG. 10, there is shown a simplified block diagram illustrating the working environment generally at 32 delineated by the X and Y trajectory of the contact probe, and in which is located the damaged area 31 to be repaired. Associated with the working arm 23 is one or more working tools, and herein three working tools, a gouging tool 33 which is a welding torch (not shown), a grinding tool 34 and a welding tool 35. The working end 23" of the working arm 23 is provided with a quick connector (not shown) and illustrated by a point 36 which is engageable with quick connectors 37, also illustrated by a point provided on each of the working tools 33 to 35. The handle 28 is also herein schematically illustrated and it is also provided with a connector 38 to interconnect with the connector point 36. The robot knows precisely the location of these connecting points and is displaced to engage a working tool, effect a work function and replace it to its initial position, and thereafter engage further tools to effect a work operation.

Figure 8H:
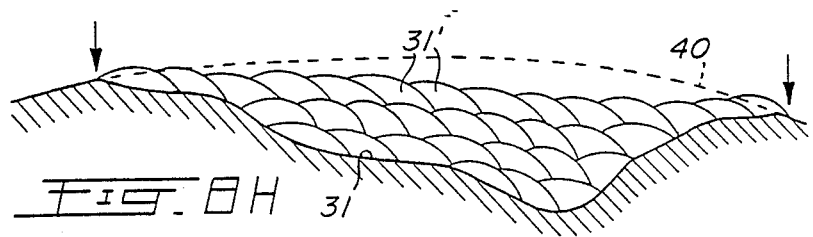
Figure 8I:
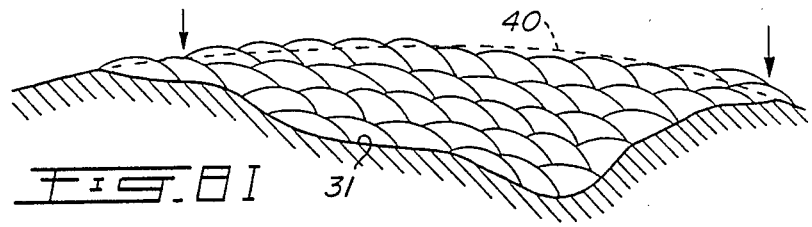
Figure 8J:
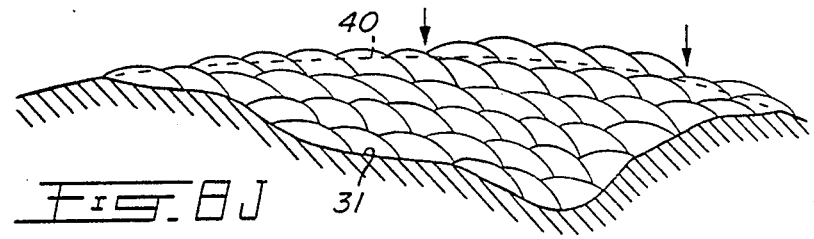
Figure 8K:
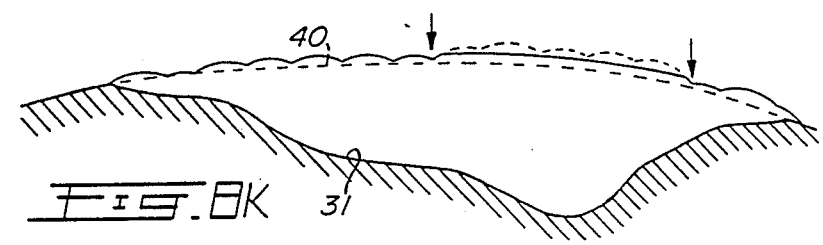
Figure 8L:
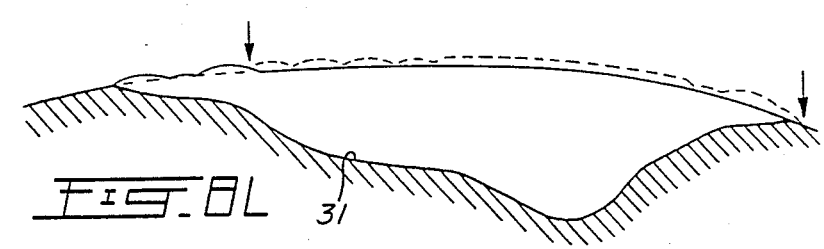
Figure 8M:
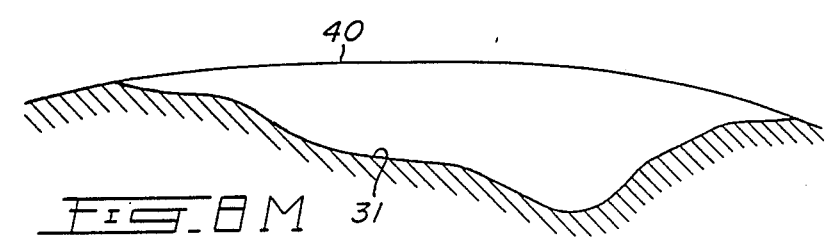

Referring now to FIGS. 8A to 8M and 9A to 9C there will be described such working operations. FIG. 9A illustrates the curved surface 11 on which there is located three damaged areas 31. The polygonal coordinates of each of those areas are determined, as above described, and the computer calculates a series of passes 39 for the gouging machine 33 to follow to effect the repair of the three damaged areas 31. The gouging torch is engaged and gouges the surfaces to the profile as shown in FIG. 9C. FIG. 9A to 9C illustrates the gouging of the damaged cavitated area 31. After the area has been gouged, the working arm then returns the gouging tool 33 to its location and engages the soldering tool 35 to deposit molten metal 31' within the cavity 31. This is illustrated in FIGS. 8E to 8J and, as can be seen, the soldering tool effects successive passes to deposit successive layers of solder material 31' until the entire cavity has been filled. The control circuit has predetermined the amount of weld metal to be deposited in the cavity, as it has knowledge of the entire surface area of the working environment, and thus knows the resulting surface profile 40 which should extend over the cavity by interpolation between the undamaged surface. Thus, weld metal is built up to and beyond this profile 40, and after this operation is effected the working arm then picks up the grinding tool 34 and grinds the top surface to bring it into conformity with the profile 40. The grinding operation is illustrated in FIGS. 8K to 8M.

Referring to FIGS. 12A and 12B, there is shown a typical construction of the grinding tool 34. The tool herein illustrated is a commercial electric or air-powered grinder driving a grinding disc 41. The disc is mounted on a suspension mechanism 42 which is controlled by a force sensor 43 to control the grinding.

FIG. 14 illustrates a typical construction of the welding torch 35. It is secured to a linkage 44 to displace the torch along a 90° axis 45. A further linkage 46 displaces the torch 35 along a further 90° axis 47 transverse to the axis 45. The center of rotation of each axis is close to the tip of the welding torch, thus minimizing the translation of the tool end point during any angular adjustment.

FIG. 11 is a block diagram illustrating the entire control system associated with the robotic member 20 of the present invention. The control circuit is based on an Intel System 310 Computer with a multi-tasking real time operating system (iRMX86). The approach taken to process control is based on a distributed mode of operation using the BITBUS interconnect from Intel. The BITBUS 50 is a microcontroller with its own operating system to accomplish a precise task, i.e., for sensor data acquisition and processing, electrode position and feed rate control for the gouging process, adjustment of parameter settings on the welding power supply 51, etc. These distributed tasks run continuously and independently of any task running under the operating system of the central computer. Communication to the BITBUS network 50 is handled in a master/slave arrangement of circuits 52 associated with the support equipment. The robot member 20 is operated by a control unit 53 and motor control circuits 54 connected to the robot member 20 through a power isolated circuit 55. A keyboard 56 and a local pendant 58 are associated with the BITBUS microcontroller to provide an interface with an operator. It is not necessary to describe the details of the control circuit as it utilizes off-the-shelf equipment well known to a person skilled in the art, and the arrangement thereof has been clearly illustrated and described.

Briefly summarizing the operation of the present invention, the track 13 is shaped to be supported parallel to a curved or flat surface 11 and the robot member 20 together with its working arm 23 and sensor 25 are displaced along the track 13 during operation. The working arm and the sensing probe 24 associated therewith are displaced along X and Y coordinates delineating a working environment for the apparatus. By using a working arm 28 associated with the sensor probe, the sensor tip is displaced in contact with the surface producing signals to the computer of the X, Y and Z coordinates. Any damaged area within the working environment is detected, either automatically or visually by the operator, and a series of coordinate points about the damaged area are selected and stored within the computer. The computer calculates the coordinates of a polygonal contour between the points and about the damaged area with reference to a reference plane. The work procedure is planned by the computer and the proper tools are selected to effect a gouging, filling and grinding operation to repair the damaged area. It is pointed out that the entire operation is effected in situ so that the operator can maintain a distance from the working tools during work cycles away from any danger.

It is within the ambit of the present invention to cover any obvious modifications of the preferred embodiment of the invention as described herein, provided such modifications fall within the scope of the appended claims. For example, the apparatus may be utilized on flat surfaces and may be used to repair all types of damages and imperfections therein. Also, the surface may be formed of materials other than metal, such as plastics, and various other tools may be associated with the robotic working arm. Also, as above mentioned, the entire operation can be automated without the intervention of an operator during the gathering of information on the delineated area and the working cycle of the robotic arm. The only intervention that may be required by an operator is the connection of the track on the object to be investigated and repaired. This method and apparatus may be applied to work functions related to the fabrication of hydraulic turbine runners or ship propellers such as preparation gouging, weld deposition on surfaces and weld overlays grinding. Also, this method and apparatus may be in conjunction with untrasonic sensors or other means of detecting flaws or imperfections on a surface.

We claim:

1. An apparatus for automatically sensing the configuration of a damaged surface area and being provided an arc gouging tool, a welding tool, and a grinding tool whereby to gouge damaged areas and fill same with weld material to at least the surface profile of said surface in said working environment and grinding said filled areas flush with said surface of said working environment, said apparatus comprising a track, bendable to a profile enabling the apparatus to work without any collision with its environment while keeping full access to the work area, the geometry of said track being generally unknown to the control circuit of the robot, a motor-actuated robot member connectible to said track, said robot member having a motorized element provided with track coupling means engaged with said track for displacing said robot member at a predetermined base and position along said track, a working arm displaceably coupled to said robot member, said working arm having one or more working tools connectible thereto, a control circuit associated with said robot member for displacing same and operating said working arm and tool, a sensor connected to said working arm and having a probe to sense a distance which is measured along a normal of said surface or any surface calculated by said control circuit assumed to be representative of said surface in a delineated working environment of said robot member and working arm, said sensory feeding information data of said X and Y and Z coordinates to said control circuit to determined the geometry of the surface of said working environment and contour of areas in said working environment requiring a work procedure to be effected by said one or more working tools.

2. The apparatus of claim 1 wherein said working arm is displaceable on said Y axis which is transverse to the X axis of displacement said robot member, said sensor having a detecting point oriented towards said surface to provide information signals in the Z-axis relative to a series of coordinate points about an area requiring work to permit said control circuit using said X, Y, and Z signals to determine the contour and shape of said area requiring work.

3. The apparatus of claim 2 wherein said detecting point is a contact probe displaced in contact with said surface to detect the distance between said reference point of said arm and said surface in said delineated working environment, said arm having a displaceable connection to permit said probe to be displaced along said Z-axis, said sensor having a strain gauge to measure said displacement.

4. The apparatus of claim 3 wherein said working arm is provided with handle means coupled to a force sensor to permit an operator to displace same to orient said detecting point relative to coordinate points about a selected damaged area in said working environment to establish a polygonal contour of said damaged area and in which to effect a controlled work functions.

5. The apparatus of claim 4 wherein said control circuit has a self-teaching programmed function and operates said motorized element to displace said robot member along said track to determine the geometry of said track so that said control circuit may relate a tool end point reference of a working tool to a Cartesian space.

6. The apparatus of claim 2 wherein said control circuit has a programming function to determine the trajectory of said tool over said areas requiring work and the number of passes of a working tool in said areas.

7. The apparatus of claim 6 wherein there is provided two or more working tools situated at predetermined locations relative to said robot member, said working tools being automatically selected and engaged by said working arm to effect controlled work functions.

8. The apparatus of claim 1 wherein said surface is a curved metal surface portion of a hydraulic turbine runner of a power generating turbine, said track being connected to said surface for in-situ repair of damaged areas or imperfections within said surface portion.

9. The apparatus of claim 8 wherein said detecting point is a distance measuring beam to detect the distance between said sensor and said surface in said delineated working environment.

10. The apparatus of claim 1 wherein said track extends along a straight axis.

11. The apparatus of claim 1 wherein said surface is a metal surface, said track being profiled to a desired shape dependent on the shape of said surface, said track being secured to a track support which is maintained elevated from said surface by adjustable support legs, said support legs being immovably secured to said surface.

12. The apparatus of claim 11 wherein said adjustable support legs are pivotally connected to said track support, said legs being adjustable in length to position said track support at a desired height relative to said surface to maintain said working arm parallel thereto.

13. A method of automatically sensing the configuration of a damaged surface area and gouging, welding and grinding it sequentially to clean the damaged irregular area, fill it with weld material and grind it flush with the surface configuration of said delineated environment, said method comprising the steps of:
(i) connecting a support track over a section of said surface area, said track having a motor-actuated robot member connecting thereto and equipped with a working arm displaceably coupled therewith, a sensor connected to said working arm, and a control circuit associated with said robot member;

(ii) displacing said robot member and working arm along X and Y coordinates respectively to delineate a working environment adjacent said track while sensing the distance between said surface and a reference point of said arm along a Z coordinate and producing information data signals of X, Y and Z coordinates to store signals indicative of the surface configuration of said working environment;

(iii) detecting irregular surface areas within said working environment;

(iv) determining a series of coordinate points about a selected irregular surface area to permit said control circuit to determine a reference plane-based on three of said pints and to find the projection of all points on this plane to determine the polygonal contour in said plane and store information signals representative thereof;

(v) selecting and connecting a tool to said working arm;

(vi) effecting a work function with said tool in said polygonal contoured area.

14. A method as claimed in claim 13 wherein said step (iv) further comprises determining a series of coordinate points inside as well as outside said irregular surface area to permit said control circuit to modelize said irregular surface and find the final profile required after the work function is completed.

15. A method as claimed in claim 13 wherein there is further provided the step of positioning two or more tools at predetermined locations with respect to said track, and automatically engaging said tools in a predetermined sequence to effect a series of work functions in said polygonal contoured area.

16. A method as claimed in claim 15 wherein there is further provided the step of self-programming said control circuit to effect said work functions by analyzing said information signals to detect the configuration of said irregular surface areas.

17. A method as claimed in claim 13 wherein said step (ii) comprises manually applying a sensing probe connected to said sensor in contact with said working environment along said X, Y and Z axes to determine said surface configuration thereof.

18. A method as claimed in claim 17 wherein said step (iii) comprises visually detecting said irregular surface areas.

19. A method as claimed in claim 18 wherein said step (iv) comprises manually displacing said probe to a series of points about one or more irregular areas to feed information signals to said control circuit for automatically delineating a polygonal contour.

20. A method as claimed in claim 13 wherein said gouging is effected with a tool which is controlled to gouge metal in said polygonal contoured surface, said gouging tool being automatically controlled and terminated when the gauged surface becomes smooth.

21. A method as claimed in claim 20 wherein there is provided the further step of grinding said gouged polygonal area to clean same prior to filling it with weld material and this provided a prepared cavity adequate for welding.

22. A method as claimed in claim 13 wherein said gouging comprises removing a plurality of successive metal layers while maintaining the gouging tool to workpiece distance substantially constant by means of monitoring the gouging current flowing through an electrode of said tool.

23. A method as claimed in claim 13 wherein said step of filling said prepared cavity includes applying a plurality of successive coats of weld material in said cavity area and maintaining welding tool to workpiece distance substantially constant by means of monitoring the welding current and voltage.

24. A method as claimed in claim 13 wherein said grinding step comprises applying a plurality of successive passes of grinding over said weld while maintaining a controlled grinding force by means of monitoring a strain gauge in said sensor.

25. A method of claim 13 wherein there is further provided the step of sensing said surface area of said polygonal damaged area between the steps of gouging, welding and grinding.

26. A method as claimed in claim 13 wherein said step (i) comprises a track support frame to said surface area and adjusting the elevation thereof and connecting said support track to said support frame.

27. A method as claimed in claim 13 wherein said steps (ii) and (iii) are effectuated by actuating a motorized element provided with track coupling means and working arm displacement means.

28. A method as claimed in claim 13 wherein said steps (ii) and (vi) are automatically effectuated by said control circuit.

* * * * *